(12) United States Patent
Mejia et al.

(10) Patent No.: US 9,785,604 B2
(45) Date of Patent: Oct. 10, 2017

(54) PRESET EVALUATION TO IMPROVE INPUT/OUTPUT PERFORMANCE IN HIGH-SPEED SERIAL INTERCONNECTS

(71) Applicant: Intel Corporation, Santa Clara, CA (US)

(72) Inventors: Ivan Herrera Mejia, Folsom, CA (US); Manuel A. Aguilar Arreola, Folsom, CA (US); Shrinivas Venkatraman, Folsom, CA (US); Andrea R. Vavra, El Dorado Hills, CA (US); Pavel Konev, Haifa (IL)

(73) Assignee: Intel Corporation, Santa Clara, CA (US)

( * ) Notice: Subject to any disclaimer, the term of this patent is extended or adjusted under 35 U.S.C. 154(b) by 0 days.

(21) Appl. No.: 13/767,881

(22) Filed: Feb. 15, 2013

(65) Prior Publication Data

US 2014/0237301 A1    Aug. 21, 2014

(51) Int. Cl.
| | | |
|---|---|---|
| *G06F 13/00* | (2006.01) | |
| *G06F 13/42* | (2006.01) | |
| *G06F 9/44* | (2006.01) | |
| *G06F 13/40* | (2006.01) | |
| *G06F 13/38* | (2006.01) | |

(52) U.S. Cl.
CPC ........ *G06F 13/4282* (2013.01); *G06F 9/4411* (2013.01); *G06F 13/385* (2013.01); *G06F 13/4072* (2013.01); *G06F 2213/0026* (2013.01)

(58) Field of Classification Search
None
See application file for complete search history.

(56) References Cited

U.S. PATENT DOCUMENTS

| | | | |
|---|---|---|---|
| 7,949,041 B2 | 5/2011 | Zerbe et al. | |
| 2004/0193669 A1 | 9/2004 | Shirani | |
| 2005/0105641 A1 | 5/2005 | Cheung et al. | |
| 2005/0201454 A1* | 9/2005 | Chaudhuri et al. | 375/229 |
| 2006/0093028 A1 | 5/2006 | Balan et al. | |
| 2006/0182205 A1* | 8/2006 | Draving | G11B 20/10009 375/346 |
| 2008/0034378 A1* | 2/2008 | Kumar et al. | 719/321 |
| 2009/0245110 A1 | 10/2009 | Connolly et al. | |

(Continued)

FOREIGN PATENT DOCUMENTS

WO    2014/051759 A1    4/2014

OTHER PUBLICATIONS

Notice of Allowance received for U.S. Appl. No. 13/631,877, mailed on Feb. 19, 2014, 9 pages.

(Continued)

*Primary Examiner* — Henry Tsai
*Assistant Examiner* — Aurangzeb Hassan
(74) *Attorney, Agent, or Firm* — Alpine Technology Law Group LLC (57) ABSTRACT

Methods and apparatus for utilization of preset evaluation to improve input/output performance in high-speed serial interconnects are described. In some embodiments, performance of a link is evaluated at a plurality of equalization values and one of the plurality of equalization values is selected for the link based on comparison of a plurality of margin values that are to be determined for each of the plurality of equalization values. Other embodiments are also claimed and/or disclosed.

26 Claims, 5 Drawing Sheets

(56) References Cited

U.S. PATENT DOCUMENTS

| | | | |
|---|---|---|---|
| 2009/0248983 A1* | 10/2009 | Offen | G06F 12/0822 |
| | | | 711/122 |
| 2009/0257514 A1 | 10/2009 | Connolly et al. | |
| 2010/0026314 A1* | 2/2010 | Schuttert | G01R 31/31709 |
| | | | 324/555 |
| 2010/0040131 A1 | 2/2010 | Tate et al. | |
| 2010/0118930 A1* | 5/2010 | Suwada | H04L 25/03878 |
| | | | 375/224 |
| 2010/0141340 A1 | 6/2010 | Huang et al. | |
| 2010/0296566 A1* | 11/2010 | Beyene | G01R 31/31708 |
| | | | 375/227 |
| 2010/0329325 A1 | 12/2010 | Mobin et al. | |
| 2011/0013499 A1* | 1/2011 | Muto | G11B 7/0037 |
| | | | 369/53.44 |
| 2011/0222594 A1 | 9/2011 | Zerbe et al. | |
| 2013/0051442 A1 | 2/2013 | Cooper et al. | |
| 2013/0208782 A1* | 8/2013 | Agrawal et al. | 375/233 |
| 2013/0322506 A1 | 12/2013 | Zerbe et al. | |
| 2014/0092952 A1 | 4/2014 | Aguilar-Arreola et al. | |
| 2014/0177695 A1* | 6/2014 | Cha | H04L 25/03133 |
| | | | 375/231 |

OTHER PUBLICATIONS

International Search Report and Written Opinion received for PCT Patent Application No. PCT/US2013/046555, mailed Sep. 27, 2013, 9 pages.

* cited by examiner

PRESET EVALUATION TO IMPROVE INPUT/OUTPUT PERFORMANCE IN HIGH-SPEED SERIAL INTERCONNECTS

FIELD

The present disclosure generally relates to the field of electronics. More particularly, an embodiment of the invention relates to techniques that utilize preset evaluation to improve input/output performance in high-speed serial interconnects.

BACKGROUND

One common Input/Output (I/O or IO) interface used in computer systems is Peripheral Component Interconnect Express (PCIe). As PCIe speeds are increased, however, some resulting signal distortion reduces signal communication reliability. For example, Inter-Symbol Interference (ISI) generally refers to a form of signal distortion where one symbol interferes with subsequent symbols. This unwanted signal distortion can have a similar effect as noise in turn making signal communication less reliable. And, some high-speed serial I/O implementations (such as PCIe) operate at frequency ranges at which the ISI becomes a major challenge for achieving a target high-speed data transfer.

BRIEF DESCRIPTION OF THE DRAWINGS

The detailed description is provided with reference to the accompanying figures. In the figures, the left-most digit(s) of a reference number identifies the figure in which the reference number first appears. The use of the same reference numbers in different figures indicates similar or identical items.

DETAILED DESCRIPTION

In the following description, numerous specific details are set forth in order to provide a thorough understanding of various embodiments. However, some embodiments are practiced without the specific details. In other instances, well-known methods, procedures, components, and circuits have not been described in detail so as not to obscure the particular embodiments. Various aspects of embodiments of the invention are performed using various means, such as integrated semiconductor circuits ("hardware"), computer-readable instructions organized into one or more programs ("software") or some combination of hardware and software. For the purposes of this disclosure reference to "logic" shall mean either hardware, software, or some combination thereof.

Some embodiments utilize preset evaluation to improve input/output (I/O or IO) performance in high-speed serial interconnects such as PCIe. In an embodiment, a flow (that may be automated) is provided to evaluate the system performance at different recommended equalization preset values and select the best equalization preset for the given system. For example, a preset search may be performed (e.g., implemented as a software-based characterization tool (e.g., implemented as part of BIOS (Basic IO System) reference code)) that is designed to calculate/determine and compare the margin(s) associated with different equalization presets for PCIe, e.g., at 8.0 GT/s or higher. Some embodiments may also recommend the best equalization preset value(s) based on information such gain, jitter and equalization controls, which can be obtained from the RX (Receiver) circuits.

As discussed herein, an equalization preset value (e.g., as supported for 8.0 GT/s transmitter) generally refers to a preset value defined in terms of voltage ratio(s), relating the pre-cursor and post-cursor equalization voltages and a margin value generally refers to the capability of the link to guarantee compliance and interoperability in production or real world conditions. Commonly used methods to measure actual link performance include jitter injection and voltage margining.

For example, the PCIe Base Specification Revision 3.0 (e.g., version 1.0, Nov. 10, 2010) defines a method to counteract Inter-Symbol Interference (ISI) via equalization. A vast number of settings within an equalization map are valid for Gen3 (generation 3) transmitters, ranging from 0 db to −9.8 db of de-emphasis and 0 db to 8.0 db pre-shoot. Within this equalization map, the Base Specification defines a set of equalization "presets." At the beginning of the equalization training sequence, the link partners communicate starting point for the equalization via preset exchange. Generally, the presets should at least guarantee a Bit Error Rate (BER) of $10^{-4}$. The subsequent equalization process aims to take the link to a BER<$10^{-12}$.

Moreover, PCIe 3.0 introduces adaptive backchannel equalization, where both upstream and downstream partners interact between the TX (Transmit) and RX (Receive) on each given lane to establish optimum equalization settings. This communication flow is defined by the specification through Phases, numbered 0-3. The process starts by having the devices communicate through "hints" and "presets". A preset generally refers to starting setting(s) (which may be later refined into final settings). Hints generally refer to suggestions for settings the other device should use. Also, devices may have their own internal flows for optimizing settings from hints and presets.

Adaptive Backchannel equalization may be implemented in hardware as a mechanism to interact between the TX and RX on a given lane to establish optimum equalization settings. The communication flow is defined by the specification through Phases, numbered 0-3, where Phase0 refers to transmitter and receiver presets sent from upstream component to downstream component (e.g., performed @ 2.5 or 5.0 GT/s speeds); Phase1 refers to link being functional at 8.0 GT/s with presets (e.g., $10^{-4}$ Bit Error Rate (BER) or better); and Phase2 refers to downstream component adjusting upstream component's transmitter setting until target BER ($10^{-12}$) is achieved; Phase3 refers to upstream component adjusting downstream component's transmitter setting until target BER (e.g., $10^{-12}$) is achieved. Adaptive equalization complexity can however became a major issue for PCI design groups. For example, hardware adaptation bugs may force post-silicon teams to invest a lot of time in implementing manual tuning techniques in addition to using painful work around methods that enabled deterministic results.

Figure 1:
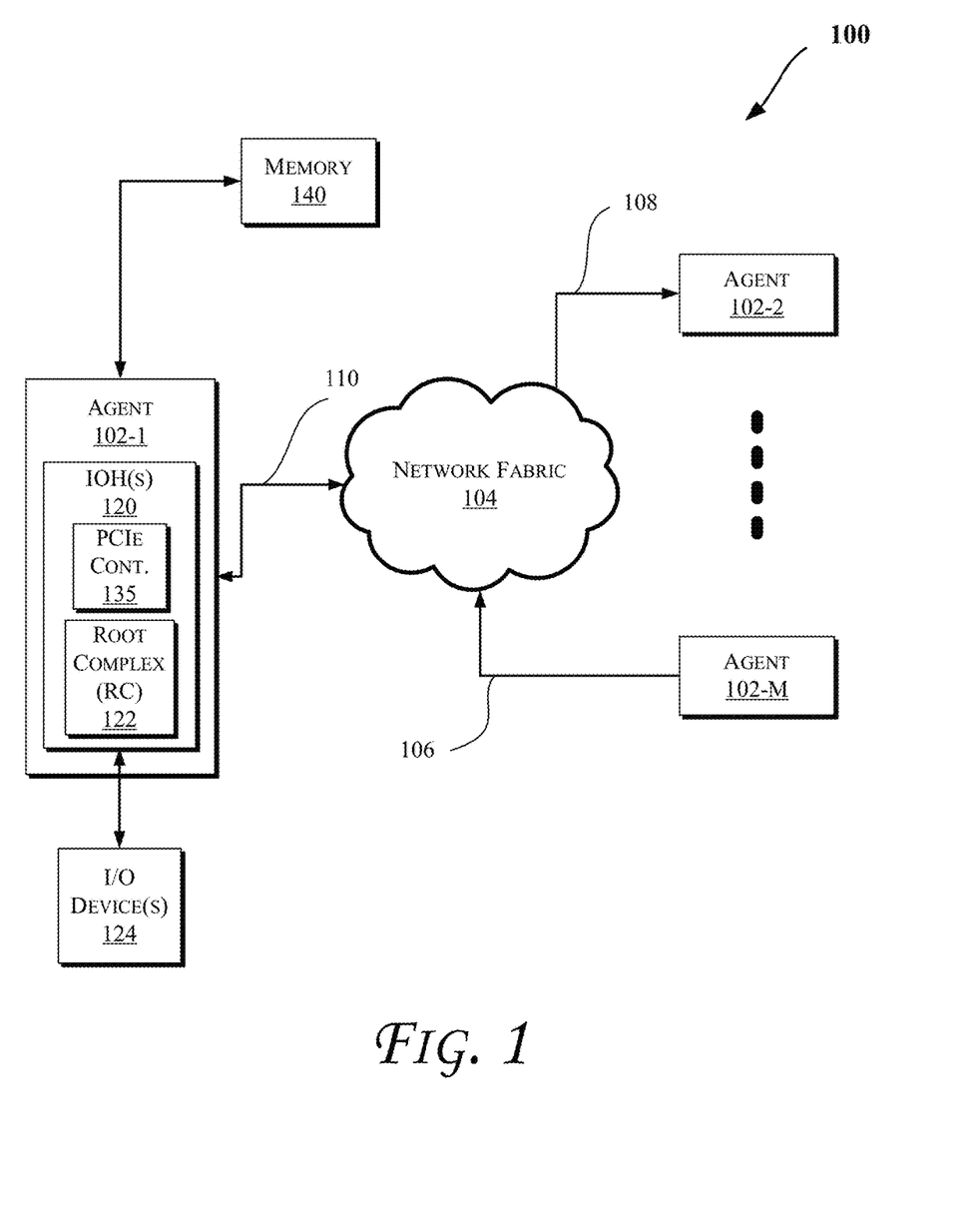
FIG. 1 illustrates a block diagram of an embodiment of a computing system, which can be utilized to implement one or more embodiments discussed herein.

Various embodiments are discussed herein with reference to a computing system component, such as the components discussed herein, e.g., with reference to FIGS. 1-2 and 4-5. More particularly, FIG. 1 illustrates a block diagram of a computing system 100, according to an embodiment of the invention. The system 100 includes one or more agents 102-1 through 102-M (collectively referred to herein as "agents 102" or more generally "agent 102"). In an embodiment, the agents 102 are components of a computing system, such as the computing systems discussed with reference to FIGS. 2 and 4-5.

As illustrated in FIG. 1, the agents 102 communicate via a network fabric 104. In an embodiment, the network fabric 104 can include one or more interconnects (or interconnection networks) that communicate via a serial (e.g., point-to-point) link and/or a shared communication network. Each link may include one or more lanes. For example, some embodiments can facilitate component debug or validation on links that allow communication with fully buffered dual in-line memory modules (FBD), e.g., where the FBD link is a serial link for coupling memory modules to a host controller device (such as a processor or memory hub). Debug information is transmitted from the FBD channel host such that the debug information is observed along the channel by channel traffic trace capture tools (such as one or more logic analyzers).

In one embodiment, the system 100 can support a layered protocol scheme, which includes a physical layer, a link layer, a routing layer, a transport layer, and/or a protocol layer. The fabric 104 further facilitates transmission of data (e.g., in form of packets) from one protocol (e.g., caching processor or caching aware memory controller) to another protocol for a point-to-point network. Also, in some embodiments, the network fabric 104 can provide communication that adheres to one or more cache coherent protocols.

Furthermore, as shown by the direction of arrows in FIG. 1, the agents 102 transmit and/or receive data via the network fabric 104. Hence, some agents utilize a unidirectional link while others utilize a bidirectional link for communication. For instance, one or more agents (such as agent 102-M) transmit data (e.g., via a unidirectional link 106), other agent(s) (such as agent 102-2) receive data (e.g., via a unidirectional link 108), while some agent(s) (such as agent 102-1) both transmit and receive data (e.g., via a bidirectional link 110).

Also, in accordance with an embodiment, one or more of the agents 102 include one or more Input/Output Hubs (IOHs) 120 to facilitate communication between an agent (e.g., agent 102-1 shown) and one or more Input/Output ("I/O" or "IO") devices 124 (such as PCIe I/O devices). The IOH 120 includes a Root Complex (RC) 122 (that includes one or more root ports) to couple and/or facilitate communication between components of the agent 102-1 (such as a processor, memory subsystem, etc.) and the I/O devices 124 in accordance with PCIe specification (e.g., in accordance with PCI Express Base Specification 3.0, also referred to as PCIe 3.0). In some embodiments, one or more components of a multi-agent system (such as processor core, chipset, input/output hub, memory controller, etc.) include the RC 122 and/or IOHs 120, as will be further discussed with reference to the remaining figures.

Additionally, the agent 102 includes a PCIe controller 135 to manage various operations of a PCIe interface including, for example, to improve the quality and/or speed of high-speed (e.g., serial) I/O channels of PCIe components in the agent 102. Further, as illustrated in FIG. 1, the agent 102-1 has access to a memory 140. As will be further discussed with reference to FIGS. 2-5, the memory 140 stores various items including for example an OS, a device driver, etc.

Figure 2:
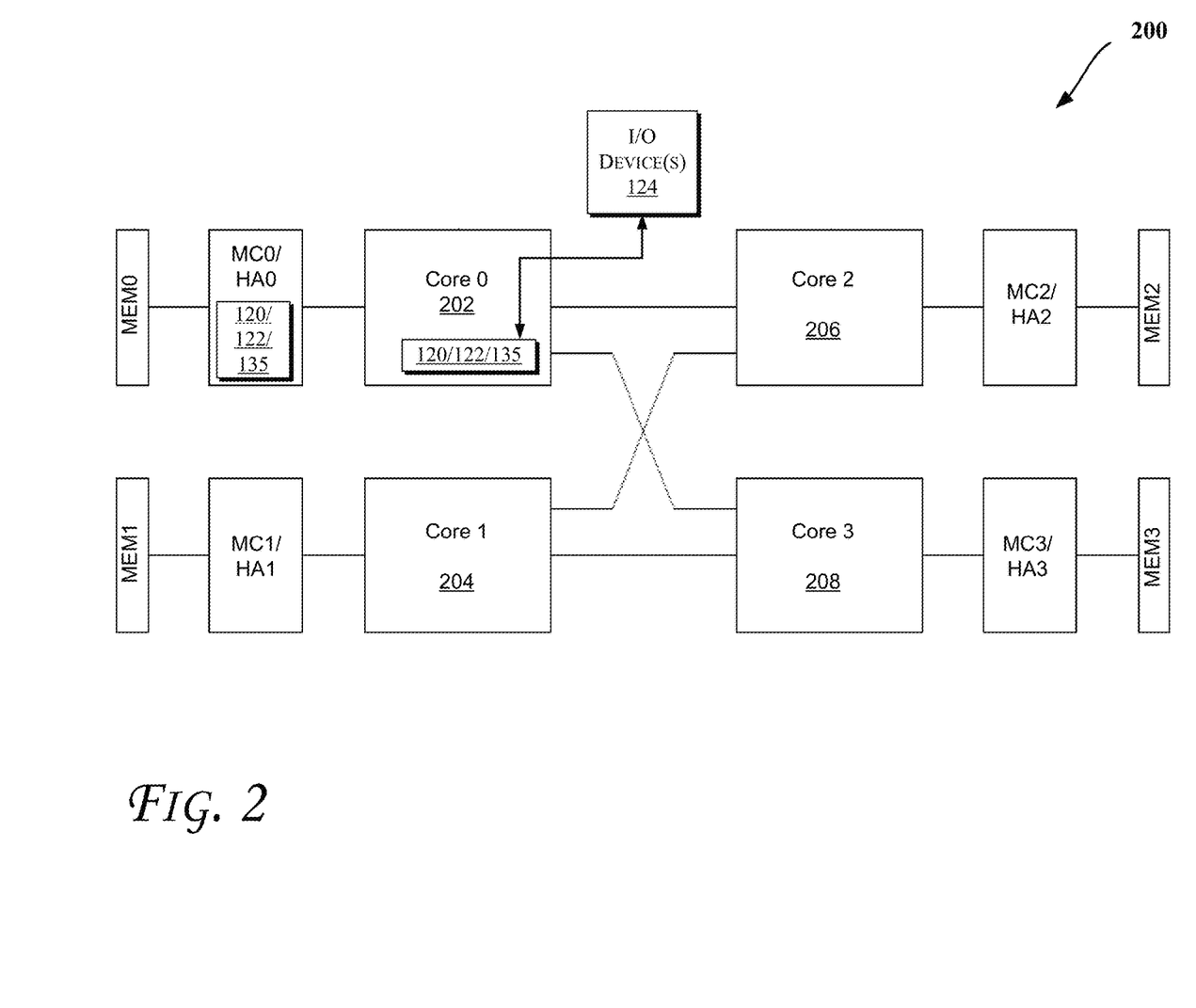
FIG. 2 illustrates a block diagram of an embodiment of a computing system, which can be utilized to implement one or more embodiments discussed herein.

More specifically, FIG. 2 is a block diagram of a computing system 200 in accordance with an embodiment. System 200 includes a plurality of sockets 202-208 (four shown but some embodiments can have more or less socket). Each socket includes a processor and one or more of IOH 120, RC 122, and PCIe Controller 135. In some embodiments, IOH 120, RC 122, and/or PCIe Controller 135 can be present in one or more components of system 200 (such as those shown in FIG. 2). Further, more or less 120, 122, and/or 135 blocks are present in a system depending on the implementation. Additionally, each socket is coupled to the other sockets via a point-to-point (PtP) link, or a differential interconnect, such as a Quick Path Interconnect (QPI), MIPI (Mobile Industry Processor Interface), etc. As discussed with respect the network fabric 104 of FIG. 1, each socket is coupled to a local portion of system memory, e.g., formed by a plurality of Dual Inline Memory Modules (DIMMs) that include dynamic random access memory (DRAM).

In another embodiment, the network fabric may be utilized for any System on Chip (SoC) application, utilize custom or standard interfaces, such as, ARM compliant interfaces for AMBA (Advanced Microcontroller Bus Architecture), OCP (Open Core Protocol), MIPI (Mobile Industry Processor Interface), PCI (Peripheral Component Interconnect) or PCIe (Peripheral Component Interconnect Express).

Some embodiments use a technique that enables use of heterogeneous resources, such as AXI/OCP technologies, in a PC (Personal Computer) based system such as a PCI-based system without making any changes to the IP resources themselves. Embodiments provide two very thin hardware blocks, referred to herein as a Yunit and a shim, that can be used to plug AXI/OCP IP into an auto-generated interconnect fabric to create PCI-compatible systems. In one embodiment a first (e.g., a north) interface of the Yunit connects to an adapter block that interfaces to a PCI-compatible bus such as a direct media interface (DMI) bus, a PCI bus, or a Peripheral Component Interconnect Express (PCIe) bus. A second (e.g., south) interface connects directly to a non-PC interconnect, such as an AXI/OCP interconnect. In various implementations, this bus may be an OCP bus.

In some embodiments, the Yunit implements PCI enumeration by translating PCI configuration cycles into transactions that the target IP can understand. This unit also performs address translation from re-locatable PCI addresses into fixed AXI/OCP addresses and vice versa. The Yunit may further implement an ordering mechanism to satisfy a producer-consumer model (e.g., a PCI producer-consumer model). In turn, individual IPs are connected to the interconnect via dedicated PCI shims. Each shim may implement the entire PCI header for the corresponding IP. The Yunit routes all accesses to the PCI header and the device memory space to the shim. The shim consumes all header read/write transactions and passes on other transactions to the IP. In some embodiments, the shim also implements all power management related features for the IP.

Thus, rather than being a monolithic compatibility block, embodiments that implement a Yunit take a distributed approach. Functionality that is common across all IPs, e.g., address translation and ordering, is implemented in the Yunit, while IP-specific functionality such as power management, error handling, and so forth, is implemented in the shims that are tailored to that IP.

In this way, a new IP can be added with minimal changes to the Yunit. For example, in one implementation the changes may occur by adding a new entry in an address redirection table. While the shims are IP-specific, in some implementations a large amount of the functionality (e.g., more than 90%) is common across all IPs. This enables a rapid reconfiguration of an existing shim for a new IP. Some embodiments thus also enable use of auto-generated interconnect fabrics without modification. In a point-to-point bus architecture, designing interconnect fabrics can be a challenging task. The Yunit approach described above leverages an industry ecosystem into a PCI system with minimal effort and without requiring any modifications to industry-standard tools.

As shown in FIG. 2, each socket is coupled to a Memory Controller (MC)/Home Agent (HA) (such as MC0/HA0 through MC3/HA3). The memory controllers are coupled to a corresponding local memory (labeled as MEM0 through MEM3), which can be a portion of system memory (such as memory 412 of FIG. 4). In some embodiments, the memory controller (MC)/Home Agent (HA) (such as MC0/HA0 through MC3/HA3) can be the same or similar to agent 102-1 of FIG. 1 and the memory, labeled as MEM0 through MEM3, can be the same or similar to memory devices discussed with reference to any of the figures herein. Generally, processing/caching agents send requests to a home node for access to a memory address with which a corresponding "home agent" is associated. Also, in one embodiment, MEM0 through MEM3 can be configured to mirror data, e.g., as master and slave. Also, one or more components of system 200 can be included on the same integrated circuit die in some embodiments.

Furthermore, one implementation (such as shown in FIG. 2) is for a socket glueless configuration with mirroring. For example, data assigned to a memory controller (such as MC0/HA0) is mirrored to another memory controller (such as MC3/HA3) over the PtP links.

Figure 3:
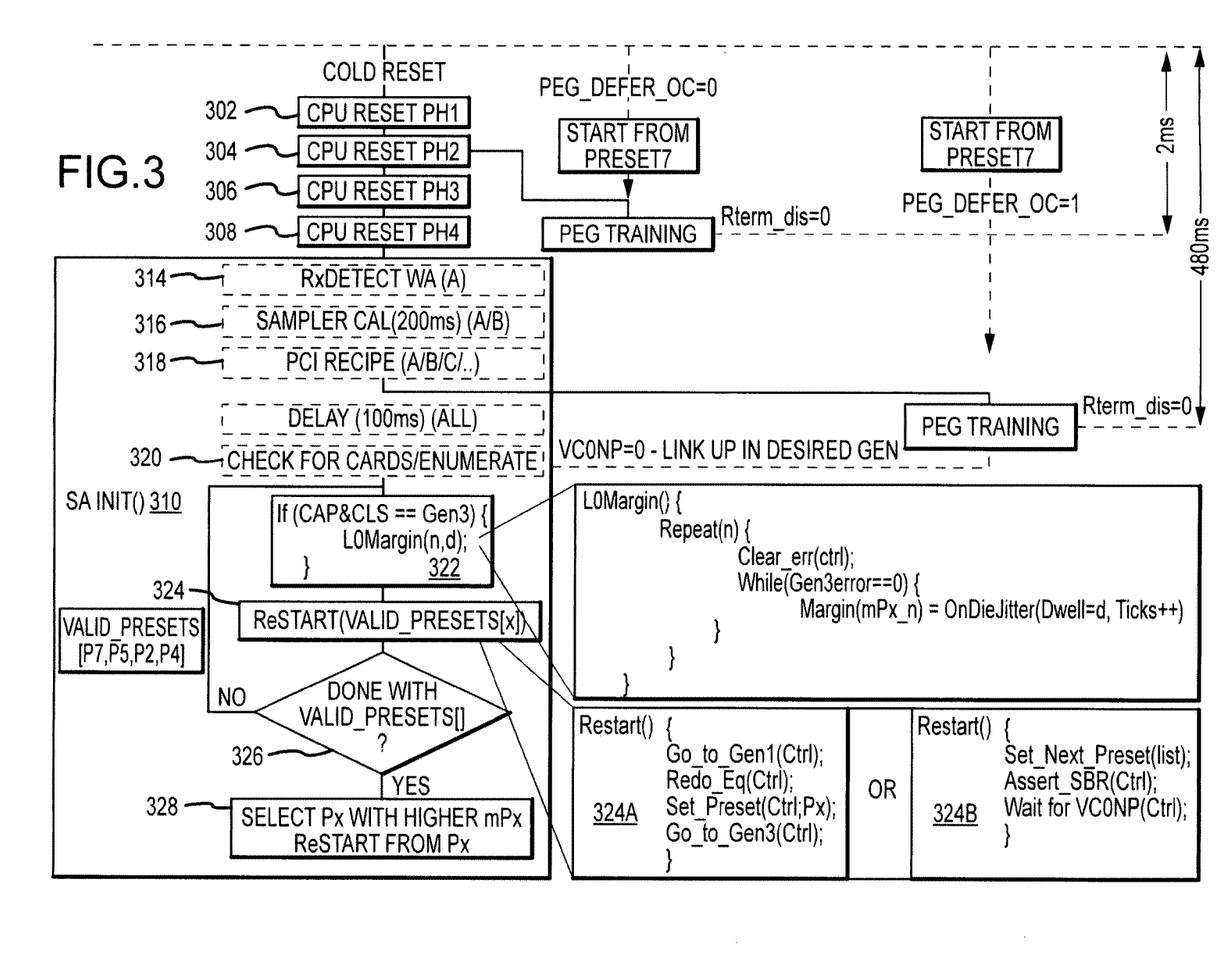
FIG. 3 illustrates a flow diagram of a method, according to an embodiment.

FIG. 3 illustrates a flow diagram of a preset search technique, according to an embodiment. In various embodiments, the operations discussed with reference to FIG. 3 are performed by one or more of the components discussed with reference to FIGS. 1, 2, 4, and/or 5 (such as logic 120, 122, 135, etc.). Also, the time values shown in FIG. 3 are examples and other time values may be used depending on the implementation.

As discussed herein, P1 (or more generally Px) refers to Preset 1 (or more generally to Preset x), PHx (such as PH1, PH2, PH3, PH4, etc.) refers to Phase x, PEG_DEFER_OC refers to delay of the training until BIOS has completed the application of recipes, Rterm_dis refers to disabling of the Rx Detect terminations, RxDetect WA (A) refers to fixes for Receiver Detect circuits, Sampler Cal (200 ms) (A/B) refers to the sampler calibration circuitry, PCI Recipe (A/B/C/ . . . ) refers to different versions of the BIOS recipe applied for PCIe controllers, Delay (100 ms) (All) refers to delay after training, VCONP refers to _Virtual Channel 0, CAP&CLS refers to PCIe express defined registers (CAP: link capability, CLS: Current Link Speed), L0Margin(n,d) refers to jitter measurement score for L0 state, Clear_err (ctrl) refers to clear link errors, mPx refers to Margin score for Preset(x), mPx_n refers to same before but n refers to measurement instance (n), Margin(mPx_n) refers to same as before, Redo_Eq(Ctrl) refers to enabled re-equalization, SBR refers to secondary bus reset, S3 generally refers to a power state such as standby, sleep, and/or suspend to Random Access Memory (RAM), e.g., while the RAM remains powered to maintain data correctness, and L0 generally refers to link operating at full width (i.e., all lanes) in both directions.

In an embodiment, the flow (shown in FIG. 3) is provided to evaluate the system performance at different recommended equalization preset values and select the best equalization preset for the given system. For example, a preset search may be performed (e.g., implemented as a software-based characterization tool (e.g., implemented as part of BIOS SA (System Agent)) reference code)) that is designed to calculate/determine and compare the margin(s) associated with different equalization presets for PCIe, e.g., at 8.0 GT/s or higher. Some embodiments may also recommend the best equalization preset value(s) based on information from the RX (Receive) circuits.

In some embodiments: (a) the flow ensures that the system is going to be adjusted to use the best preset on any topology/configuration and with any specific Add-In Card (AIC). For example, some board manufactures may use different type materials that might not aligned directly with recommendation(s). On such systems, the channel loss will not be directly matching with the expected loss per inch average numbers. Preset search flow will guarantee target BER by selecting the best preset on those boards; (b) the flow reduces the risk of having OEM (Original Equipment Manufacturer) configuring the system to a wrong preset. The preset search flow will guarantee the best preset is used on a specific topology. The flow will find the ideal preset for any particular system during the manufacturing boot. The results (e.g., Preset 7 or P7) may be stored on BIOS (Basic IO System) flash, and then restored from flash on any subsequent Cold/Warm/S3 reset (e.g., after cold reset 302, CPU resets 304-308, etc.); (c) The flow enables calibration of systems not only by using different presets but also by trying different knobs as part of the receiver architecture (e.g., CTLE (Continuous Time Linear Equalizer) peaking), as a method for improving Gen3 performance; and/or (d) Implementing preset search as a software-implemented method may provide the typical advantages over the hardware based approach, e.g., in terms modification flexibility.

Referring to FIG. 3, in an embodiment, the method of FIG. 3 is performed during PEI phase (Pre-EFI (pre Extensible Firmware Interface) initialization phase) flow 310 (e.g., for IO devices 124 which may be based on information stored in BIOS in an embodiment), e.g., right after PEG (PCI Express Graphics) is trained at 312 for the first time into the 8.0 GT/s speed. For instance, after initialization at 314-318 (and some delay, e.g., of 100 ms at all interfaces), it is checked whether card(s) (AICs) are coupled to the PCIe link at 320. At 322, if a coupled card is Gen3, L0Margin is invoked/executed to set margin(s) for the link at L0, e.g., per on die jitter values.

At 324, the link is restarted (e.g., using the two restart routines 324A and/or 324B shown in FIG. 3). For example, the link speed is changed back to gen1 (PCIe generation 1), re-do equalization bit is asserted, and preset is changed or set (e.g., based on list of valid presets such as P7, P3, P5, P2, P4, etc.) before returning the link speed to Gen3 and return the link state to L0. In an embodiment, P7, P3 and P7 are used as the presets, however it is possible to use the method of FIG. 3 on additional valid presets. If not, jitter injection may be enabled to margin the link at 322 and 324 is repeated. This (e.g., operation(s) at 322 and/or 324) is repeated until all presets are evaluated at 326. Once done, at 328, the preset with the highest margins is selected and the link is retained using that preset.

In one embodiment, the preset determined at 328 is stored (e.g., in BIOS flash or other memory devices discussed herein) for future boots. In some embodiments, the save and restore flow is only run on the first cold boot (e.g., where the first boot will find the best preset (Px) and save it on board's flash/memory and subsequent boots/S3 exits will fetch the resulting preset from flash/memory).

Furthermore, in some embodiments, optimal preset that maximizes electrical margins may be a function of channel insertion loss as follows: (1) shortest channels (e.g., less than or equal to 3 inch or equivalent channel insertion loss), where best point is found at or near to P5 (or Preset 5); (2) medium channel (e.g., between 3-8 inch or equivalent channel insertion loss), where the best point is found at or near to P3 (or Preset 3); and (3) long channel (e.g., more than 8 inch or equivalent channel insertion loss), where the best point is found at or near to P7 (or Preset 7). However, IO performance with P7 may not be always best for all topologies/platforms, e.g., because board/channel characteristics might affect the results.

Figure 4:
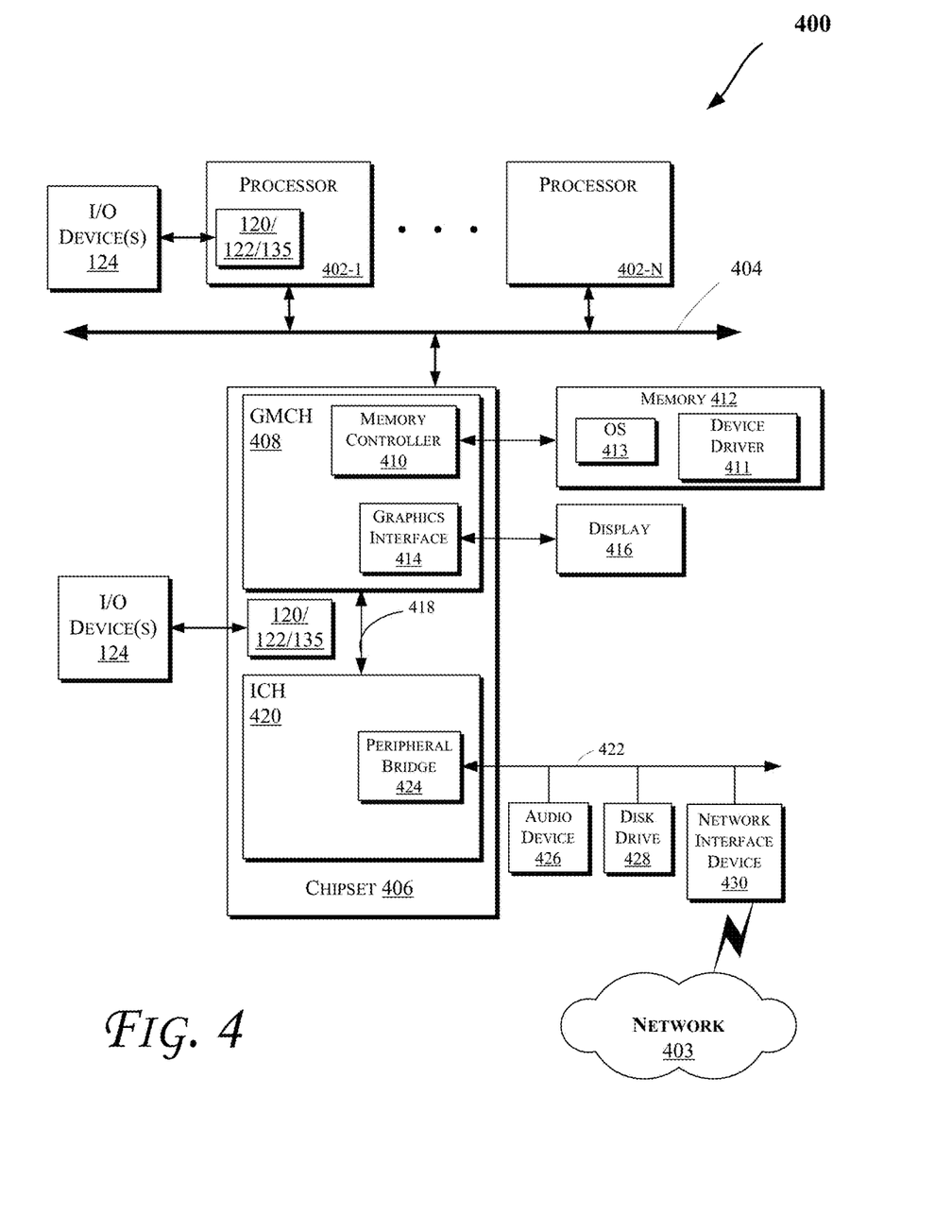
FIG. 4 illustrates a block diagram of an embodiment of a computing system, which can be utilized to implement one or more embodiments discussed herein.

FIG. 4 illustrates a block diagram of a computing system 400 in accordance with an embodiment of the invention. The computing system 400 includes one or more central processing unit(s) (CPUs) 402-1 through 402-N or processors (collectively referred to herein as "processors 402" or more generally "processor 402") that communicate via an interconnection network (or bus) 404. The processors 402 include a general purpose processor, a network processor (that processes data communicated over a computer network 403), or other types of a processor (including a reduced instruction set computer (RISC) processor or a complex instruction set computer (CISC)). Moreover, the processors 402 can have a single or multiple core design. The processors 402 with a multiple core design can integrate different types of processor cores on the same integrated circuit (IC) die. Also, the processors 402 with a multiple core design can be implemented as symmetrical or asymmetrical multiprocessors.

Also, the operations discussed with reference to FIGS. 1-3 are performed by one or more components of the system 400. In some embodiments, the processors 402 can be the same or similar to the processors 202-208 of FIG. 2. Furthermore, the processors 402 (or other components of the system 400) include one or more of the IOH 120, RC 122, and the PCIe Controller 135. Moreover, even though FIG. 4 illustrates some locations for items 120/122/135, these components can be located elsewhere in system 400. For example, I/O device(s) 124 can communicate via bus 422, etc.

A chipset 406 also communicates with the interconnection network 404. The chipset 406 includes a graphics and memory controller hub (GMCH) 408. The GMCH 408 includes a memory controller 410 that communicates with a memory 412. The memory 412 stores data, including sequences of instructions that are executed by the CPU 402, or any other device included in the computing system 400. For example, the memory 412 stores data corresponding to an operation system (OS) 413 and/or a device driver 411 as discussed with reference to the previous figures. In an embodiment, the memory 412 and memory 140 of FIG. 1 can be the same or similar. In one embodiment of the invention, the memory 412 can include one or more volatile storage (or memory) devices such as random access memory (RAM), dynamic RAM (DRAM), synchronous DRAM (SDRAM), static RAM (SRAM), or other types of storage devices. Nonvolatile memory can also be utilized such as a hard disk. Additional devices can also communicate via the interconnection network 404, such as multiple CPUs and/or multiple system memories.

Additionally, one or more of the processors 402 can have access to one or more caches (which include private and/or shared caches in various embodiments) and associated cache controllers (not shown). The cache(s) can adhere to one or more cache coherent protocols. Such cache(s) store data (e.g., including instructions) that are utilized by one or more components of the system 400. For example, the cache locally caches data stored in a memory 412 for faster access by the components of the processors 402. In an embodiment, the cache (that is shared) can include a mid-level cache and/or a last level cache (LLC). Also, each processor 402 can include a level 1 (L1) cache. Various components of the processors 402 can communicate with the cache directly, through a bus or interconnection network, and/or a memory controller or hub.

The GMCH 408 also includes a graphics interface 414 that communicates with a display device 416, e.g., via a graphics accelerator. In one embodiment of the invention, the graphics interface 414 can communicate with the graphics accelerator via an accelerated graphics port (AGP). In an embodiment of the invention, the display 416 (such as a flat panel display) can communicate with the graphics interface 414 through, for example, a signal converter that translates a digital representation of an image stored in a storage device such as video memory or system memory into display signals that are interpreted and displayed by the display 416. In an embodiment, the display signals produced by the display device pass through various control devices before being interpreted by and subsequently displayed on the display 416.

A hub interface 418 allows the GMCH 408 and an input/output control hub (ICH) 420 to communicate. The ICH 420 provides an interface to I/O devices that communicate with the computing system 400. The ICH 420 communicates with a bus 422 through a peripheral bridge (or controller) 424, such as a peripheral component interconnect (PCI) bridge, a universal serial bus (USB) controller, or other types of peripheral bridges or controllers. The bridge 424 provides a data path between the CPU 402 and peripheral devices. Other types of topologies can be utilized. Also, multiple buses can communicate with the ICH 420, e.g., through multiple bridges or controllers. Moreover, other peripherals in communication with the ICH 420 include, in various embodiments of the invention, integrated drive electronics (IDE) or small computer system interface (SCSI) hard drive(s), USB port(s), a keyboard, a mouse, parallel port(s), serial port(s), floppy disk drive(s), digital output support (e.g., digital video interface (DVI)), or other devices.

The bus 422 communicates with an audio device 426, one or more disk drive(s) 428, and a network interface device 430 (which is in communication with the computer network 403). Other devices can also communicate via the bus 422. Also, various components (such as the network interface device 430) can communicate with the GMCH 408 in some embodiments of the invention. In addition, the processor 402 and one or more components of the GMCH 408 and/or chipset 406 are combined to form a single integrated circuit chip (or be otherwise present on the same integrated circuit die) in some embodiments.

Furthermore, the computing system 400 includes volatile and/or nonvolatile memory (or storage). For example, non-volatile memory includes one or more of the following: read-only memory (ROM), programmable ROM (PROM), erasable PROM (EPROM), electrically EPROM (EEPROM), a disk drive (e.g., 428), a floppy disk, a compact disk ROM (CD-ROM), a digital versatile disk (DVD), flash memory, a magneto-optical disk, or other types of nonvolatile machine-readable media that are capable of storing electronic data (e.g., including instructions).

Figure 5:
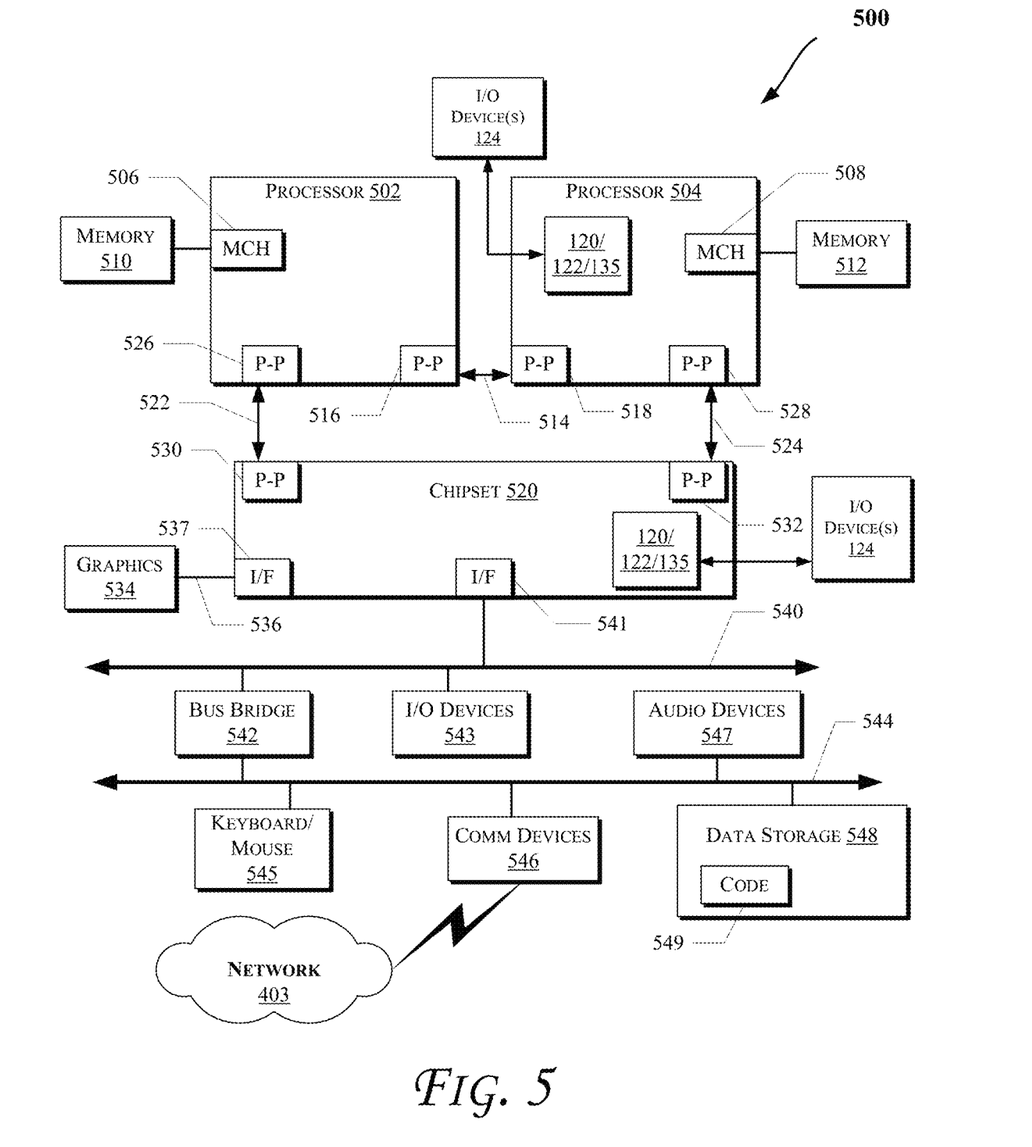
FIG. 5 illustrates a block diagram of an embodiment of a computing system, which can be utilized to implement one or more embodiments discussed herein.

FIG. 5 illustrates a computing system 500 that is arranged in a point-to-point (PtP) configuration, according to an embodiment of the invention. In particular, FIG. 5 shows a system where processors, memory, and input/output devices are interconnected by a number of point-to-point interfaces. The operations discussed with reference to FIGS. 1-4 are performed by one or more components of the system 500.

As illustrated in FIG. 5, the system 500 includes several processors, of which only two, processors 502 and 504 are shown for clarity. The processors 502 and 504 each include a local memory controller hub (MCH) 506 and 508 to enable communication with memories 510 and 512. The memories 510 and/or 512 store various data such as those discussed with reference to the memory 412 of FIG. 4. As shown in FIG. 5, the processors 502 and 504 also include the cache(s) discussed with reference to FIG. 4 in some embodiments.

In an embodiment, the processors 502 and 504 can be one of the processors 402 discussed with reference to FIG. 4. The processors 502 and 504 exchange data via a point-to-point (PtP) interface 514 using PtP interface circuits 516 and 518, respectively. Also, the processors 502 and 504 each exchange data with a chipset 520 via individual PtP interfaces 522 and 524 using point-to-point interface circuits 526, 528, 530, and 532. The chipset 520 further exchanges data with a high-performance graphics circuit 534 via a high-performance graphics interface 536, e.g., using a PtP interface circuit 537.

At least one embodiment of the invention is provided within the processors 502 and 504 or chipset 520. For example, the processors 502 and 504 and/or chipset 520 include one or more of the IOH 120, RC 122, and the PCIe Controller 135. Other embodiments of the invention, however, exist in other circuits, logic units, or devices within the system 500 of FIG. 5. Furthermore, other embodiments of the invention can be distributed throughout several circuits, logic units, or devices illustrated in FIG. 5. Hence, location of items 120/122/135 shown in FIG. 5 is exemplary and these components may or may not be provided in the illustrated locations.

The chipset 520 communicates with a bus 540 using a PtP interface circuit 541. The bus 540 can have one or more devices that communicate with it, such as a bus bridge 542 and I/O devices 543. Via a bus 544, the bus bridge 542 communicates with other devices such as a keyboard/mouse 545, communication devices 546 (such as modems, network interface devices, or other communication devices that communicate with the computer network 403), audio I/O device, and/or a data storage device 548. The data storage device 548 stores code 549 that is executed by the processors 502 and/or 504.

The following examples pertain to further embodiments. Example 1 is an apparatus comprising: first logic to evaluate performance of a link at a plurality of equalization values; and second logic to select one of the plurality of equalization values for the link based on comparison of a plurality of margin values that are to be determined for each of the plurality of equalization values.

In example 2, the subject matter of example 1 can optionally include the selected equalization value having a highest margin value from the plurality of margin values.

In example 3, the subject matter of example 1 the subject matter of example 1 can optionally include the first logic evaluating performance of the link at the plurality of equalization values based on information from a receive circuit coupled to the link.

In example 4, the subject matter of example 1 can optionally include memory to store the plurality of equalization values.

In example 5, the subject matter of example 1 can optionally include memory to store the plurality of margin values.

In example 6, the subject matter of example 1 can optionally include the link coupling a first agent to a second agent, wherein the first agent is to comprise one or more of: a processor core, a chipset, an input/output hub, and a memory controller.

In example 7, the subject matter of example 1 can optionally include the link coupling a first agent to a second agent, wherein the second agent is to comprise an input/output device.

In example 8, the subject matter of example 1 can optionally include the link comprising a point-to-point coherent interconnect.

In example 9, the subject matter of example 1 can optionally include the link coupling a first agent to a second agent, wherein the first agent is to comprise a plurality of processor cores and one or more sockets.

In example 10, the subject matter of example 1 can optionally include the link coupling a first agent to a second agent, wherein one or more of the first agent, the second agent, and a memory are on a same integrated circuit chip.

In example 11, the subject matter of example 1 can optionally include the link comprising a Peripheral Component Interconnect Express (PCIe) link.

Example 12 is a method comprising: evaluating performance of a link at a plurality of equalization values; and selecting one of the plurality of equalization values for the link based on comparison of a plurality of margin values that are to be determined for each of the plurality of equalization values.

In example 13, the subject matter of example 12 can optionally include the selected equalization value being a highest margin value from the plurality of margin values.

In example 14, the subject matter of example 12 can optionally include evaluating performance of the link at the plurality of equalization values being performed based on information from a receive circuit coupled to the link.

In example 15, the subject matter of example 12 can optionally include the link comprising a point-to-point coherent interconnect.

In example 16, the subject matter of example 12 can optionally include the link comprising a Peripheral Component Interconnect Express (PCIe) link.

In example 17, the subject matter of example 12 can optionally include retaining the link in accordance with the selected equalization value.

Example 18 is a non-transitory computer-readable medium comprising one or more instructions that when executed on a processor configure the processor to perform one or more operations to: evaluate performance of a link at a plurality of equalization values; and select one of the plurality of equalization values for the link based on comparison of a plurality of margin values that are to be determined for each of the plurality of equalization values.

In example 19, the subject matter of example 18 can optionally include the one or more instructions when executed on the processor configuring the processor to select a highest margin value from the plurality of margin values as the selected equalization value.

In example 20, the subject matter of example 18 can optionally include the one or more instructions when executed on the processor configuring the processor to evaluate performance of the link at the plurality of equalization values based on information from a receive circuit coupled to the link.

In example 21, the subject matter of example 18 can optionally include the link comprising a point-to-point coherent interconnect.

In example 22, the subject matter of example 18 can optionally include the link comprising a Peripheral Component Interconnect Express (PCIe) link.

In example 23, the subject matter of example 18 can optionally include the one or more instructions when executed on the processor configuring the processor to cause retention of the link in accordance with the selected equalization value.

In various embodiments of the invention, the operations discussed herein, e.g., with reference to FIGS. 1-5, can be implemented as hardware (e.g., circuitry), software, firmware, microcode, or combinations thereof, which can be provided as a computer program product, e.g., including a (e.g., non-transitory) machine-readable or (e.g., non-transitory) computer-readable medium having stored thereon instructions (or software procedures) used to program a computer to perform a process discussed herein. Also, the term "logic" may include, by way of example, software, hardware, or combinations of software and hardware. The machine-readable medium may include a storage device such as those discussed with respect to FIGS. 1-5. Additionally, such computer-readable media may be downloaded as a computer program product, wherein the program is transferred from a remote computer (e.g., a server) to a requesting computer (e.g., a client) by way of data signals transmitted via a carrier wave or other propagation medium via a communication link (e.g., a bus, a modem, or a network connection).

Reference in the specification to "one embodiment" or "an embodiment" means that a particular feature, structure, or characteristic described in connection with the embodiment may be included in at least an implementation. The appearances of the phrase "in one embodiment" in various places in the specification may or may not be all referring to the same embodiment.

Also, in the description and claims, the terms "coupled" and "connected," along with their derivatives, may be used. In some embodiments of the invention, "connected" may be used to indicate that two or more elements are in direct physical or electrical contact with each other. "Coupled" may mean that two or more elements are in direct physical or electrical contact. However, "coupled" may also mean that two or more elements may not be in direct contact with each other, but may still cooperate or interact with each other.

Thus, although embodiments of the invention have been described in language specific to structural features and/or methodological acts, it is to be understood that claimed subject matter may not be limited to the specific features or acts described. Rather, the specific features and acts are disclosed as sample forms of implementing the claimed subject matter.

The invention claimed is:

1. An apparatus comprising:
    first logic to evaluate performance of a link at a plurality of equalization values; and
    second logic to select an equalization value from the plurality of equalization values for the link based on comparison of a plurality of margin values that are to be determined for each of the plurality of equalization values, wherein the second logic is to select the equalization value during a pre Extensible Firmware Interface initialization phase and after PEG (Peripheral Component Interface (PCI) Express Graphics) is trained, wherein the plurality of margin values are to be determined for the link based at least in part on a plurality of on-die jitter values, wherein the plurality of on-die jitter values are to be generated by jitter injection to be repeated until all of the plurality of margin values are evaluated, wherein the plurality of equalization values are to be determined based on electrical margins as a function of corresponding channel insertion loss, wherein the channel insertion loss corresponds to one of: a short channel, having a length of less than or equal to three inches; a medium channel, having a length between about three to eight inches; or a long channel, having a length of more than eight inches.

2. The apparatus of claim 1, wherein the selected equalization value has a highest margin value from the plurality of margin values.

3. The apparatus of claim 1, wherein the first logic is to evaluate performance of the link at the plurality of equalization values based on information from a receive circuit coupled to the link.

4. The apparatus of claim 1, further comprising memory to store the plurality of equalization values.

5. The apparatus of claim 1, further comprising memory to store the plurality of margin values.

6. The apparatus of claim 1, wherein the link is to couple a first agent to a second agent, wherein the first agent is to comprise one or more of: a processor core, a chipset, an input/output hub, and a memory controller.

7. The apparatus of claim 1, wherein the link is to couple a first agent to a second agent, wherein the second agent is to comprise an input/output device.

8. The apparatus of claim 1, wherein the link is to comprise a point-to-point coherent interconnect.

9. The apparatus of claim 1, wherein the link is to couple a first agent to a second agent, wherein the first agent is to comprise a plurality of processor cores and one or more sockets.

10. The apparatus of claim 1, wherein the link is to couple a first agent to a second agent, wherein one or more of the first agent, the second agent, and a memory are on a same integrated circuit chip.

11. The apparatus of claim 1, wherein the link is to comprise a Peripheral Component Interconnect Express (PCIe) link.

12. A method comprising:
    evaluating performance of a link at a plurality of equalization values; and
    selecting an equalization value from the plurality of equalization values for the link based on comparison of a plurality of margin values that are to be determined for each of the plurality of equalization values, wherein selecting the equalization value is performed during a pre Extensible Firmware Interface initialization phase and after PEG (Peripheral Component Interface (PCI) Express Graphics) is trained, wherein the plurality of margin values are determined for the link based at least in part on a plurality of on-die jitter values, wherein the plurality of on-die jitter values are generated by jitter injection that is repeated until all of the plurality of margin values are evaluated, wherein the plurality of equalization values are determined based on electrical margins as a function of corresponding channel insertion loss, wherein the channel insertion loss corresponds to one of: a short channel, having a length of less than or equal to three inches; a medium channel, having a length between about three to eight inches; or a long channel, having a length of more than eight inches.

13. The method of claim 12, wherein the selected equalization value has a highest margin value from the plurality of margin values.

14. The method of claim 12, wherein evaluating performance of the link at the plurality of equalization values is performed based on information from a receive circuit coupled to the link.

15. The method of claim 12, wherein the link comprises a point-to-point coherent interconnect.

16. The method of claim 12, wherein the link comprises a Peripheral Component Interconnect Express (PCIe) link.

17. The method of claim 12, further comprising retaining the link in accordance with the selected equalization value.

18. A non-transitory computer-readable medium comprising one or more instructions that when executed on a processor configure the processor to perform one or more operations to:
evaluate performance of a link at a plurality of equalization values; and
select an equalization value from the plurality of equalization values for the link based on comparison of a plurality of margin values that are to be determined for each of the plurality of equalization values, wherein selecting the equalization value is performed during a pre Extensible Firmware Interface initialization phase and after PEG (Peripheral Component Interface (PCI) Express Graphics) is trained, wherein the plurality of margin values are determined for the link based at least in part on a plurality of on-die jitter values, wherein the plurality of on-die jitter values are generated by jitter injection that is repeated until all of the plurality of margin values are evaluated, wherein the plurality of equalization values are to be determined based on electrical margins as a function of corresponding channel insertion loss, wherein the channel insertion loss corresponds to one of: a short channel, having a length of less than or equal to three inches; a medium channel, having a length between about three to eight inches; or a long channel, having a length of more than eight inches.

19. The non-transitory computer-readable medium of claim 18, wherein the one or more instructions when executed on the processor are to configure the processor to select a highest margin value from the plurality of margin values as the selected equalization value.

20. The non-transitory computer-readable medium of claim 18, wherein the one or more instructions when executed on the processor are to configure the processor to evaluate performance of the link at the plurality of equalization values based on information from a receive circuit coupled to the link.

21. The non-transitory computer-readable medium of claim 18, wherein the link comprises a point-to-point coherent interconnect.

22. The non-transitory computer-readable medium of claim 18, wherein the link comprises a Peripheral Component Interconnect Express (PCIe) link.

23. The non-transitory computer-readable medium of claim 18, wherein the one or more instructions when executed on the processor are to configure the processor to cause retention of the link in accordance with the selected equalization value.

24. The apparatus of claim 1, wherein the plurality of equalization values are to be determined based on the channel insertion loss.

25. The apparatus of claim 1, wherein the second logic is to perform the search to select the equalization value during the pre Extensible Firmware Interface initialization phase and after the PEG (Peripheral Component Interface (PCI) Express Graphics) is first trained.

26. The apparatus of claim 1, wherein a Basic Input/Output System (BIOS) is to store one or more preset values corresponding to the plurality of equalization values.

* * * * *

UNITED STATES PATENT AND TRADEMARK OFFICE
CERTIFICATE OF CORRECTION

PATENT NO. : 9,785,604 B2  
APPLICATION NO. : 13/767881  
DATED : October 10, 2017  
INVENTOR(S) : Mejia et al.

Page 1 of 3

It is certified that error appears in the above-identified patent and that said Letters Patent is hereby corrected as shown below:

In the Claims

In Column 12, Line 53, cancel the text beginning with "12. A method comprising:" to and ending "than eight inches." In Column 13, Line 8, and insert the following claim:

--12. The apparatus of claim 1, wherein the plurality of equalization values are to be determined based on the channel insertion loss.--

In Column 13, Line 9, cancel the text beginning with "13. The method of" to and ending "of margin values." In Column 13, Line 11, and insert the following claim:

--13. The apparatus of claim 1, wherein the second logic is to perform the search to select the equalization value during the pre Extensible Firmware Interface initialization phase and after the PEG (Peripheral Component Interface (PCI) Express Graphics) is first trained.--

In Column 13, Line 12, cancel the text beginning with "14. The method of" to and ending "to the link." In Column 13, Line 15, and insert the following claim:

--14. The apparatus of claim 1, wherein a Basic Input/Output System (BIOS) is to store one or more preset values corresponding to the plurality of equalization values.--

In Column 13, Line 16, cancel the text beginning with "15. The method of" to and ending "coherent interconnect." In Column 13, Line 17, and insert the following claim:

--15. A method comprising: evaluating performance of a link at a plurality of equalization values; and selecting an equalization value from the plurality of equalization values for the link based on comparison of a plurality of margin values that are to be determined for each of the plurality of equalization values, wherein selecting the equalization value is performed during a pre Extensible Firmware Interface initialization phase and after PEG (Peripheral Component Interface (PCI) Express Graphics) is trained, wherein the plurality of margin values are determined for the link based at least in Signed and Sealed this  
Twenty-seventh Day of February, 2018

Andrei Iancu  
*Director of the United States Patent and Trademark Office*

CERTIFICATE OF CORRECTION (continued)
U.S. Pat. No. 9,785,604 B2 part on a plurality of on-die jitter values, wherein the plurality of on-die jitter values are generated by jitter injection that is repeated until all of the plurality of margin values are evaluated, wherein the plurality of equalization values are determined based on electrical margins as a function of corresponding channel insertion loss, wherein the channel insertion loss corresponds to one of: a short channel, having a length of less than or equal to three inches; a medium channel, having a length between about three to eight inches; or a long channel, having a length of more than eight inches.--

In Column 13, Line 18, cancel the text beginning with "16. The method of" to and ending "Interconnect Express (PCIe) link." In Column 13, Line 18, and insert the following claim:

--16. The method of claim 15, wherein the selected equalization value has a highest margin value from the plurality of margin values.--

In Column 13, Line 20, cancel the text beginning with "17. The method of" to and ending "selected equalization value." In Column 13, Line 21, and insert the following claim:

--17. The method of claim 15, wherein evaluating performance of the link at the plurality of equalization values is performed based on information from a receive circuit coupled to the link.--

In Column 13, Line 22, cancel the text beginning with "18. A non-transitory" to and ending "than eight inches." In Column 14, Line 7, and insert the following claim:

--18. The method of claim 15, wherein the link comprises a point-to-point coherent interconnect.--

In Column 14, Line 8, cancel the text beginning with "19. The non-transitory" to and ending "selected equalization value." In Column 14, Line 12, and insert the following claim:

--19. The method of claim 15, wherein the link comprises a Peripheral Component Interconnect Express (PCIe) link.--

In Column 14, Line 13, cancel the text beginning with "20. The non-transitory" to and ending "to the link." In Column 14, Line 18, and insert the following claim:

--20. The method of claim 15, further comprising retaining the link in accordance with the selected equalization value.--

In Column 14, Line 19, cancel the text beginning with "21. The non-transitory" to and ending "coherent interconnect." In Column 14, Line 21, and insert the following claim:

--21. A non-transitory computer-readable medium comprising one or more instructions that when executed on a processor configure the processor to perform one or more operations to: evaluate performance of a link at a plurality of equalization values; and select an equalization value from the plurality of equalization values for the link based on comparison of a plurality of margin values that are to be determined for each of the plurality of equalization values, wherein selecting the equalization value is performed during a pre Extensible Firmware Interface initialization phase and after PEG (Peripheral Component Interface (PCI) Express Graphics) is trained, wherein the plurality

CERTIFICATE OF CORRECTION (continued)
U.S. Pat. No. 9,785,604 B2 of margin values are determined for the link based at least in part on a plurality of on-die jitter values, wherein the plurality of on-die jitter values are generated by jitter injection that is repeated until all of the plurality of margin values are evaluated, wherein the plurality of equalization values are to be determined based on electrical margins as a function of corresponding channel insertion loss, wherein the channel insertion loss corresponds to one of: a short channel, having a length of less than or equal to three inches; a medium channel, having a length between about three to eight inches; or a long channel, having a length of more than eight inches.--

In Column 14, Line 22, cancel the text beginning with "22. The non-transitory" to and ending "Express (PCIe) link." In Column 14, Line 24, and insert the following claim:

--22. The non-transitory computer-readable medium of claim 21, wherein the one or more instructions when executed on the processor are to configure the processor to select a highest margin value from the plurality of margin values as the selected equalization value.--

In Column 14, Line 25, cancel the text beginning with "23. The non-transitory" to and ending "selected equalization value." In Column 14, Line 29, and insert the following claim:

--23. The non-transitory computer-readable medium of claim 21, wherein the one or more instructions when executed on the processor are to configure the processor to evaluate performance of the link at the plurality of equalization values based on information from a receive circuit coupled to the link.--

In Column 14, Line 30, cancel the text beginning with "24. The apparatus of" to and ending "channel insertion loss." In Column 14, Line 32, and insert the following claim:

--24. The non-transitory computer-readable medium of claim 21, wherein the link comprises a point-to-point coherent interconnect.--

In Column 14, Line 33, cancel the text beginning with "25. The apparatus of" to and ending "in first trained." In Column 14, Line 37, and insert the following claim:

--25. The non-transitory computer-readable medium of claim 21, wherein the link comprises a Peripheral Component Interconnect Express (PCIe) link.--

In Column 14, Line 38, cancel the text beginning with "26. The apparatus of" to and ending "of equalization values." In Column 14, Line 40, and insert the following claim:

--26. The non-transitory computer-readable medium of claim 21, wherein the one or more instructions when executed on the processor are to configure the processor to cause retention of the link in accordance with the selected equalization value.--